United States Patent [19]
Abbema et al.

[11] Patent Number: 5,566,984
[45] Date of Patent: Oct. 22, 1996

[54] CYLINDRICAL CORROSION BARRIER FOR PIPE CONNECTIONS

[76] Inventors: William D. Abbema, Rte. 3 Box 3344, Pearland, Tex. 77581; John K. Lewis, 5870 Hwy. 6 N. Suite 200, Houston, Tex. 77084

[21] Appl. No.: 280,858

[22] Filed: Jul. 26, 1994

Related U.S. Application Data

[63] Continuation-in-part of Ser. No. 221,834, Apr. 1, 1994.

[51] Int. Cl.$^6$ ............................................. F16L 13/02
[52] U.S. Cl. .......................... 285/22; 285/55; 285/351; 285/370; 228/50
[58] Field of Search ............................. 285/55, 370, 21, 285/22, 351; 228/50

[56] References Cited

U.S. PATENT DOCUMENTS

| | | |
|---|---|---|
| 2,366,579 | 1/1945 | Von Ahrens . |
| 2,764,426 | 9/1956 | Von Ahrens ............................. 285/22 |
| 2,814,508 | 11/1957 | Seamark . |
| 2,829,909 | 4/1958 | Magnani . |
| 3,076,261 | 2/1963 | Christensen ........................... 285/22 |
| 3,165,082 | 1/1965 | Baker ................................ 285/22 X |
| 3,508,766 | 10/1968 | Kessler et al. . |
| 3,961,814 | 6/1976 | Byrne et al. ........................... 285/21 |
| 4,257,630 | 3/1981 | Bartell et al. ......................... 285/21 |
| 4,619,470 | 10/1986 | Overath ................................ 285/55 |
| 4,786,089 | 11/1988 | McConnell ....................... 285/370 X |
| 4,811,975 | 3/1989 | Paul et al. ............................ 285/351 |
| 4,913,465 | 4/1990 | Abbema et al. . |
| 5,104,152 | 4/1992 | Galfant . |
| 5,131,694 | 7/1992 | Portis ................................. 285/351 |
| 5,282,652 | 2/1994 | Werner . |
| 5,346,261 | 9/1994 | Abbema . |

FOREIGN PATENT DOCUMENTS

| | | | |
|---|---|---|---|
| 1293983 | 4/1962 | France ................................. 285/55 |
| 6713372 | 12/1967 | Netherlands ........................... 285/55 |

*Primary Examiner*—Dave W. Arola
*Attorney, Agent, or Firm*—Patterson & Streets, L.L.P.

[57] ABSTRACT

A connection joining abutted ends of pipe includes a sleeve therein which provides a continuous seal to protect the juncture of the pipe ends and the interior portions of the pipe adjacent the pipe ends from the materials passing through the pipe. The sleeve may be configured from a non-metallic material, such as PTFE, and a plurality of seal rings may be located on the outer circumference thereof to seal the sleeve to the interior surface of the pipe. The non-metallic sleeve is inherently non-corrosive, and therefore no secondary protective coatings need be provided on the interior surfaces of the pipe connection to protect the weld. To position the sleeve in the pipe ends, the sleeve may include a plurality of removable spacer pins thereon which are removed from the sleeve before the weld connection is completed. The sleeve may include circumferential end recesses forming a minor diameter end portion which is receivable in a tubular barrier material where the pipe includes an internal barrier material. The sleeve may also be configured from a material having a greater elasticity than the pipe material, such that the sleeve material expands outwardly, when materials are flowed therethrough under pressure, to seal the pipe connection.

18 Claims, 3 Drawing Sheets

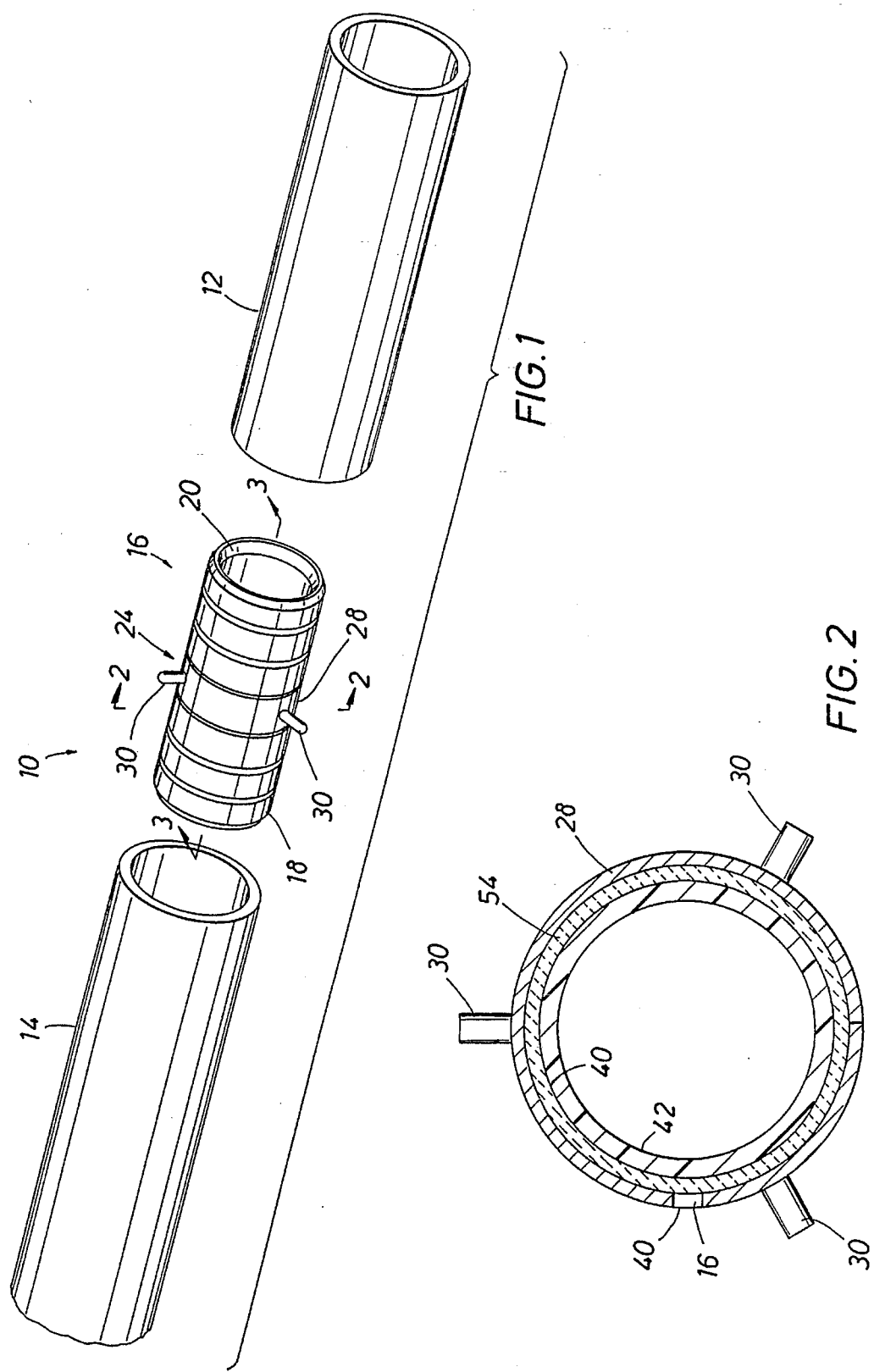

CYLINDRICAL CORROSION BARRIER FOR PIPE CONNECTIONS

This is a continuation in part of U.S. patent application Ser. No. 08/221,834, filed Apr. 1, 1994.

BACKGROUND OF THE INVENTION

The present invention relates to the field of pipe connections. More particularly, the present invention relates to the field of welded pipe connections normally useful in the oil and gas production, refining and transportation industries, flanged pipe connections normally useful in the chemical plant industry.

Tubular goods, such as pipe used to transport oil and gas and products thereof, must be capable of withstanding the corrosive and/or erosive attributes of materials passing therethrough without failure. Such pipe is commonly manufactured from alloy steels which have insufficient anti-corrosive and/or anti-erosive properties to withstand attack from the gasses and fluids which are passed therethrough. Therefore, the interior regions of these pipes are commonly coated with protective materials, such as thin polymer based coatings or cement based liners, which form a protective barrier between the pipe material and the materials passing through the pipe. Where the pipe may be continually exposed to highly corrosive environments, such as in chemical plants where hydrofluoric or hydrochloric acid might be flowed through the pipe, the protective barrier may be constructed of a tubular PTFE based material, such as a PTFE based material sold by DuPont Corporation Tefzel®, or with other erosion or corrosion resistant materials in tubular form that extend the length of the interior diameter of the pipe.

Pipe used to transport oil, gas, and their products is typically configured in lengths of up to approximately 60 feet, and more typically at lengths of less than 45 feet. Therefore, to span any substantial distance using this pipe, the individual lengths of pipe must be connected end to end. In the oil and gas transportation industry, the most common method of connecting the individual lengths of pipe is by welding their ends together. Welding of the pipe ends presents several pipe material protection problems. First, where the pipe is protected by a thin polymer coating, the heat generated during welding destroys the coating adjacent the weld joint. This exposes the pipe material, and the weld, to the corrosive and erosive fluids passing through the pipe. Therefore, the weld area, and the pipe adjacent the weld, must be supplementally protected from the erosive and/or corrosive pipe environment.

One method of protecting the weld connection from the material flowing through the pipe is to apply a protective coating to the interior of the weld connection after welding. After several pipe lengths have been welded together, a re-coating pig is sent down the pipe to re-coat the weld joint in-situ. This in-situ re-coating is expensive and time consuming.

Another method of protecting the area of the pipe adjacent a weld employs an intermediate insert which fits into the pipe adjacent a weld joint to form a physical barrier between the weld and the materials passing through the pipe. One such insert is shown in U.S. Pat. No. 5,219,187, Mikitka, wherein the insert is configured as an internally coated sleeve provided in a supplemental pipe segment, which supplemental pipe segment is welded to one end of a pipe. The sleeve is integrally provided in the pipe segment, preferably covers the entire inner diameter of the pipe segment, and also extends outwardly from the free end of the pipe segment when the pipe segment is welded to the pipe. To connect the length of pipe with the sleeve projecting therefrom into an adjacent pipe, the sleeve is inserted into the end of the adjacent pipe, and the free end of the pipe segment is welded to the end of the adjacent pipe. When the pipe segment and adjacent pipe end are welded together, a portion of the protective coatings on the interior of the pipe and sleeve are destroyed by the heat of the weld. Additionally, if the sleeve is damaged at any point, the entire pipe to which it is attached is rendered useless.

Another insert for protecting pipe ends at weld joints is disclosed in U.S. Pat. No. 4,913,465, Abbema. In that reference, a metallic sleeve is placed into the ends of two adjacent pipes prior to welding the adjacent ends of the pipe together. The sleeve includes a circumferential recessed area, which aligns under the weld as the weld is formed, and a seal disposed on either side of the recessed area. An insulative wrap and a plurality of heat retaining strips are received in the recessed area. The heat retaining strips span the recessed area and contact the mass of the metallic sleeve at either end of the strip. Each strip also includes alignment bosses thereon, to which the pipe ends are physically engaged to provide a pre-selected gap between adjacent pipe ends and to center the sleeve within the two pipe ends. These alignment bosses are sacrificed into the weld during welding.

The connection system disclosed in Abbema has several limitations. First, the sleeve is metallic and therefore transfers a substantial amount of heat from the welding operation along the inner diameter of the pipe. This heat can destroy the interior protective coating on the pipe at a substantial distance inwardly of the pipe end. In an attempt to mask the area of the pipe where the protective layer is destroyed, the sleeve is configured as a spanning element, i.e., it spans the burned or otherwise destroyed portion of the interior pipe coating adjacent the pipe ends. Additionally, the sleeve is metallic, and it is also subject to corrosion or erosion when exposed to the pipe fluids or gasses. In an attempt to obviate any corrosion or erosion problem with the sleeve, a secondary protective coating is applied, before the sleeve is inserted into the pipe ends, to the inner diameter of the sleeve and to the portion of the outer diameter of the sleeve adjacent the ends of the sleeve. Also, a mastic is applied to the inner diameter of the pipe. The mastic lubricates the sleeve upon insertion of the sleeve into the pipe end and provides a secondary coating barrier if the coating on the outer diameter of the sleeve is damaged. However, during welding operations, the heat of welding will travel through the heat retaining straps and into the sleeve at discrete spots around the circumference of the sleeve, and this heat will transfer through the sleeve and create localized burned areas of protective coating at the inner diameter of the sleeve. The mastic will also be partially destroyed by heat during welding operations, and the mastic may become disengaged from the sleeve ends and expose any defects in the sleeve coating to the erosive and corrosive pipe environment. Further, the seal configuration on the sleeve does not fully protect the weld area from the erosive and/or corrosive conditions within the pipe. The seal provided on either side Of the recess cannot span the possible gaps which may be present as a result of the tolerance on the pipe inner diameter. Therefore, when the pipe inner diameter is at the high end of the acceptable tolerance, the seal may not engage the pipe. Likewise, when the pipe inner diameter is at the low side of the tolerance, the seal may be destroyed as the sleeve is shoved into the pipe end, particularly if the seal is configured for the high end of the inner diameter tolerance. In either case, fluids passing through the pipe may enter the annular area between the sleeve and the pipe. Additionally, the mastic may interfere with the seating of the seals against the inner diameter of the pipe, which will allow pipe fluids and gasses to leach between the sleeve and the pipe. Finally, the bosses used to align the pipe ends and maintain the proper weld gap may, when sacrificially incorporated into the weld, reduce the strength of the weld and thereby reduce the effectiveness of the weld connection.

The corrosive nature of some fluids also limits the utility of pipelines or runs where in the individual pipe segments are welded together. Pipelines and pipe runs used in chemical plant applications also have erosive and/or corrosive fluids passing therethrough, but are typically constructed differently than as described above for welded pipe connection. Pipe used in chemical plant applications, although readily available in lengths of up to 40 feet, is typically configured in lengths of only 10 feet, and occasionally in lengths of up to 20 feet. The limiting factor on pipe length in chemical plant applications is the need to provide a barrier between the steel or other material forming the pipe, and the potentially corrosive or erosive materials flowed through the pipe. Standard industry practice is to provide this barrier by pulling a length of protective tubing, such as the above-mentioned Tefzel® material, through the pipe segments to form a barrier between the pipe material and the material flowed through the pipe. The pipe ends cannot be welded where such an inner barrier material is used, because the heat of welding the pipe will destroy the barrier material, and there is no convenient means for connecting the lengths of protective barrier material tubing extending within the pipe that is capable of withstanding the forces generated within the barrier material as materials are flowed therethrough. Therefore, to connect adjacent lengths of this pipe, the individual pipe ends are provided with flanges, and the end of the tubular barrier material within each length of pipe is flared outwardly to be received between the flanges. By connecting adjacent pipe flanges, the ends of each segment of the tubular barrier are secured between the flanges, and a continuous barrier having a circumferential joint at the flanges is provided.

The flange method of joining adjacent lengths of pipe, and the inner barrier material, is expensive, time consuming, and subject to failure. One primary failure mode which occurs with this connection system is a stress fracture in the barrier material where the barrier material is flanged outwardly to be received between the flanges of the adjacent pipe ends. Because the barrier material typically has a higher coefficient of thermal expansion than the pipe material, the barrier material expands and contracts as the pipe thermally cycles in use. As the tubular barrier is fixed only at its ends, i.e., at the flanges, the tubular barrier has some freedom to move except at the flanges, and thus the stress caused by thermal expansion of the barrier material is highest where the tubular barrier is flared outwardly to be joined in the flange. Thus, the tubular barrier will crack at this location, necessitating removal of the pipe and replacement of the tubular barrier material. This commonly requires disassembly of a substantial length of the pipe line extending from the failure point to an elbow, or other location in the pipe run.

The second major problem associated with the interconnection of the tubular barrier material at a flange connection also relates to the higher coefficient of thermal expansion of the tubular barrier as compared to the pipe material. The longer the length of the tubular barrier, the greater the total linear expansion or contraction of the tubular barrier over a given temperature range. Pipe lengths in the chemical processing industry are generally limited to 20 foot lengths, because longer lengths would create excessive thermal expansion and cause the tubular barrier to break at the aforementioned flange position or to buckle in the pipe.

A third problem associated with the connection of the tubular barrier material between the pipe flanges is the difficulty of forming the connection in all seasons and environments. The tubular barrier material has a memory and tends to return to its final shape after being flared to be received in the flange, which return to the initial configuration occurs fastest at high temperatures. At low temperatures, the formability of the material is low, so the time needed to flare the tubing is increased, and the brittleness is greater, so the chance of breaking the tubing while forming the flare is increased. These factors add up to provide a connection that is difficult to form.

A fourth problem associated with flanged pipe connection is material fabrication and availability. Flanged pipe is not readily available in different pipe lengths for all pipe diameters, and the pipe line or pipe run fabricator typically has to weld flanges onto the pipe on site, or special order flanged pipe of various lengths, to provide the major runs of pipe on the job site. In either case, the flanged pipe is more expensive to provide for a given pipe line or pipe run, than a welded pipe line or pipe run.

SUMMARY OF THE INVENTION

The present invention includes a corrosion resistant sleeve useful for providing a continuous corrosion barrier at the connection of adjacent pipe ends which is especially well-suited for providing a continuous barrier between adjacent pipe ends where corrosive or erosive gases, fluids or slurries are flowed through the pipe. In one embodiment of the invention which is useful for pipe having an inner tubular barrier, the sleeve is preferably a tubular member having recessed portions on the outer surface of the tubular member extending inwardly from either end thereof. In the most preferred embodiment of the invention, two seal rings are located in circumferential grooves in the outer recessed areas. Each of the seals extend different distances from the surface of the sleeve to ensure sealing between the inner surface of the pipe or the pipe barrier and the sleeve outer surfaces of the sleeve throughout the tolerance range of the pipe or pipe barrier. Additionally, the recesses are preferably sized to provide an expansion gap between the sleeve and the adjacent end of the tubular barrier material, to allow the barrier material to thermally expand or contract without excessive compressive loading occurring in the barrier material or in the sleeve.

In a sub-embodiment of the invention, the sleeve includes a central circumferential alignment recess in which multiple removable spacers are located. These spacers provide the desired spacing between the pipe ends for welding, but are removable prior to the completion of the weld joint. Thus, in this embodiment, the spacers are not sacrificed into the weld.

In an additional embodiment of the invention, the sleeve material has a higher elasticity than the pipe material, and therefore, when materials are flowed through the pipe and sleeve under pressure, the sleeve will expand against the inner circumferential surface of the pipe to further seal the connection.

BRIEF DESCRIPTION OF THE DRAWINGS

These and other advantages of the invention will be apparent from reading the description of the embodiments, when read in conjunction with the following drawings, wherein:

FIG. 1 is an exploded view of one embodiment of the continuous corrosion barrier of the invention;

FIG. 2 is a sectional view of the connection of FIG. 1 at section 2—2;

DESCRIPTION OF THE EMBODIMENTS

Figure 3:
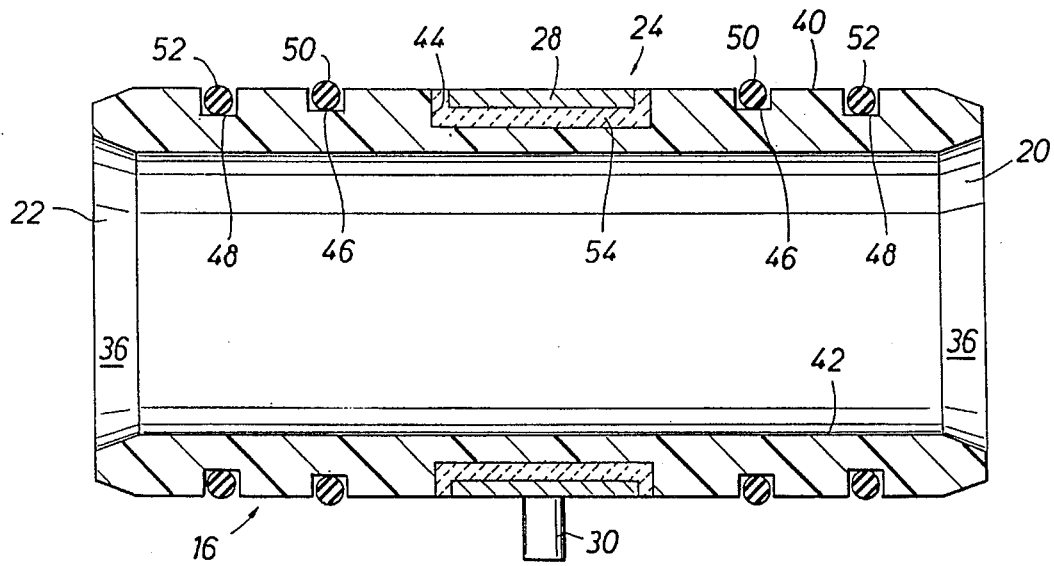
FIG. 3 is a further sectional view of the connection of FIG. 1 at section 3—3.

Referring to FIG. 1, one embodiment of the continuous corrosion barrier 10 of the present invention generally includes a sleeve 16 which is received in adjacent ends 12, 14 of adjacent lengths of internally coated pipe. This embodiment of the invention is primarily useful, but not limited to, pipeline applications wherein a thin protective coating is applied to the inner diameter of the pipe and the pipe ends 12, 14 are welded together. The sleeve 16 includes a generally right cylindrical housing 18, having opposed open ends 20, 22, (end 22 shown in FIG. 3), and a central shielding portion 24, which is partially received into the pipe end 12 when one end of the sleeve 16 is fully received into the pipe end 12. The central shielding portion 24 of the sleeve 16 preferably includes a ring member 28, having a plurality, preferably three to six, of alignment spacers 30 circumferentially spaced thereabout and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided. When the sleeve 16 is properly positioned in the pipe ends 12, 14, the pipe ends 12, 14 contact, or are in close proximity to, the spacers 30. Preferably, the spacers 30 are configured as pins, which extend outwardly from the outer diameter of the pipe, or may be configured as spherical balls.

During a welding operation, particularly a multiple pass welding operation, substantial heat is generated which will increase the temperature of the pipe ends 12, 14 above the burning or transformation temperature of the thin protective coating maintained on the interior surface of the pipe and prior art metallic sleeve. When the areas of the coating on the inside of the pipe and the on the inside of the prior art internally coated metallic sleeve are destroyed during welding, the underlying pipe material and sleeve material will be exposed to the gases or fluids which are passed through the pipe. This can cause the pipe or the sleeve to fail. Therefore, to properly protect the weld joint, the sleeve 16 must provide a barrier to prevent the materials such as fluids or gases from contacting, and then eroding and/or corroding, the exposed areas of the pipe, and also provide a non-compromised inner surface on the sleeve 16 to protect the weld and the sleeve 16 from corrosion and/or erosion from the materials passing through the pipe. The sleeve 16 of the present invention may be configured to meet both requirements. Referring now to FIG. 3, the embodiment of the sleeve 16 of the present invention primarily useful for weld connection of interiorly coated pipes is shown in detail. In this embodiment, the sleeve 16 is a generally tubular member, having an outer circumferential surface 40 with a diameter slightly less than the minimum inner diameter tolerance of the pipe 12, 14 into which the sleeve 16 is to be inserted. This ensures that the sleeve 16 may be inserted into any pipe end 12, 14 which is within the tolerance range for the specific pipe size. It should be appreciated that multiple sizes of sleeves 16, corresponding to the numerous available nominal pipe diameters, may be provided to cover the available ranges of pipe sizes which are connected by welding. The inner circumferential surface 42 of the sleeve has a diameter sized to allow an inspection pig, or other such pipe cleaning or flow volume separating mechanism, to pass therethrough. The ends 20, 22 of the sleeve 16 preferably include a tapered inner surface 36, extending from the ends 20, 22 of the sleeve 16 to a position interiorly of the sleeve ends 20, 22. The tapered inner surface 36 is provided to help prevent a pig or other device from engaging the end of the sleeve 16 and dislodging it, and to increase the flowability of gases and fluids through pipe.

The outer surface 40 of the sleeve 16 includes a central alignment recess 44 located at the approximate longitudinal center of the sleeve 16 in which the ring 28 is at least partially received, and a pair of seal grooves, 46, 48 extending circumferentially about the sleeve 16 on either side of the alignment recess 44. The groove 46 on either side of the alignment recess 44 is located equidistant either side of the alignment recess 44 and have a first depth to accommodate a first seal 50 such as an o-ring therein. The first seal 50 is preferably a high temperature seal configured from a high temperature material, such as silicone, capable of withstanding a temperature of approximately 300 degrees fahrenheit. The second grooves 48 are positioned between the first grooves 46 and the adjacent end 20 or 22 of the pipe, and are sized at a second depth, greater than that of the first groove 46, to receive a second seal 52 such as an o-ring therein. The second seal 52 may be a buna material capable of withstanding temperatures on the order of 150 degrees fahrenheit. The seals 50, 52 preferably have the same cross section, and therefore the first seal 50 will extend further from the outer surface 40 of the sleeve 16 than will the second seal 52 prior to insertion of the sleeve 16 into the pipe end 12 or 14. If the sleeve 16 will be exposed to high pressures within the pipe, backup rings may be provided in the grooves 46, 48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the seal material therein. It has been found that if the first grooves 46 are located approximately one inch from the center of the weld and the second grooves 48 are disposed approximately two inches from the center of the weld, the seals 50, 52 will not experience temperatures exceeding the above described limits when the pipe ends 12, 14 are welded together. By providing different groove depths for grooves 46, 48, and placing o-ring seals 50, 52 therein of the same cross-section, the outer circumferences of the seals 50, 52 will span the API tolerance gap of the diameters of pipe ends 12, 14. Therefore, if the pipe end 12 is at the minimum diameter tolerance, and pipe end 14 is at the maximum diameter tolerance, then both of the seals 50, 52 on the portion of the sleeve 16 received in the pipe end 12 will seal against the inner surface of the pipe end 12, but only the seal 50 on the portion of the sleeve 16 received in pipe end 14 will seal against the inner surface thereof. However, sealing engagement of one seal to the inner pipe surface on either side of the weld is sufficient to ensure that a seal is made to prevent entry of pipe fluids and gases to the area of the weld.

In addition to sealing the weld area of the connection 10, the sleeve 16 is configured to provide a heat shield to limit the passage of heat from the weld and into the inner diameter of the sleeve 16. To limit the heat transfer from the weld, the alignment recess 44 includes a heat shielding member 54 received therein. The heat shielding member is preferably a high temperature, high purity material, such as a ceramic tape or ceramic paper having a melting point of approximately 3200 degrees F. The heat shielding member 54 protects the sleeve 16 from direct burning by the weld and insulates the sleeve 16 from the heat generated by the weld. A ring member 28 is also received in the alignment recess 44, over the heat shielding member 54. The ring member 28 is preferably a metallic ring, which supports the spacers 30 which are used to align the pipe ends 12, 14 for welding and to properly position the sleeve 16 in the pipe ends 12, 14. However, this ring 28 also tends to transfer heat from the weld area. To limit the heat transfer from the ring member 28 into the body of the sleeve 16, the width of the ring member 28 is preferably slightly smaller than the width of the alignment recess 44, and the insulative material preferably extends between the base and sides of the ring member 28 and the base and sides of the alignment recess 44. By isolating the ring member from direct contact with the mass of the sleeve 16, the amount of heat transferred from the weld to the sleeve 16 is reduced. This reduces the potential peak temperature experienced at the inner circumferential 42 of the sleeve 16 to a level below that which would detrimentally affect the ability of the material exposed at the inner circumferential surface 42 of the sleeve 16 to resist corrosion and/or erosion.

To further limit heat transfer from the weld, the sleeve 16 is preferably a monolithic, i.e. homogeneous one piece member preferably formed from a thermally insulative material such as PTFE, which may be filled with fiberglass or with a composition of 20% carbon and 5% graphite, or with a mineral oil based material approved by the FDA such as wollastimite, all of which are available from EGC, Corp. of Houston Tex., or such other material having high heat stability, high abrasion resistance, low reactivity and low thermal creep. A sleeve 16 made from a PTFE or similar base material will limit the heat transfer from the weld along the sleeve outer surface, and through the sleeve 16, by an amount sufficient to protect the seals 50, 52 and the inner circumferential surface 42 of the sleeve 16 from excessive temperatures. Additionally, such a sleeve 16 material is as impervious to the fluids and gasses passing through the welded connection as the internal lining of the pipe. Therefore, the sleeve 16 does not need to be separately coated as in the prior art. Although the preferred sleeve 16 configuration is a one piece homogeneous member, many of the advantageous of the connection 10 construction may be used in conjunction with a metallic, coated, sleeve 16.

Figure 4:
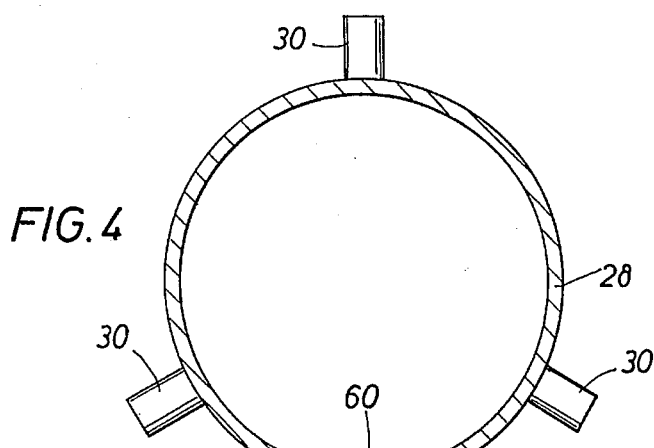
FIG. 4 is a side view of the alignment ring of the sleeve of the present invention, before assembly onto a sleeve member.

Referring now to FIGS. 2 and 4, the ring member 28 is a preferably a loop of material, formed substantially into a ring prior to being placed onto the sleeve 16. Preferably, the loop is formed from the same material as the pipe material, such as an alloy steel. The loop includes a gap 60 formed between the opposed ends 62 of the loop. When the loop is located over the sleeve 16, the opposed ends 62 are preferably tack welded together to secure the ring member 28 in the alignment recess. Alternatively, the ring member 28 may be provided with a gap which allows the ring member 28 to spring out and into contact with the inner diameter of the pipe. Thus, when the pipe ends 12, 14 are welded together, the ring 28 will become welded to the inside of the pipe ends 12, 14. When the ring member 28 is formed over the sleeve 16 by tack welding the ends 62 of the ring member 28 together, the ring member 28 becomes locked into position in the alignment recess 44. Thus, once the ring member 28 is welded in place within the pipe ends 12, 14, the sleeve 16 is then locked in place in the pipe ends 12, 14. Thus, the alignment recess 44 serves to align the ring member 28, and the spacers 30 extending therefrom, at a specific location with respect to the ends of the sleeve 16.

To prepare a pipe joint using the continuous corrosion barrier 10 of the present invention, the sleeve 16 is first prepared by compressing the split ring member 28 into the alignment recess 44 over the insulative member 54, and the ends 62 of the ring 28 are tack welded together. This may be performed on site, or the ring member 28 may be tack welded in place when the sleeve is manufactured, or at intermediate steps in between. The sleeve 16, with the seals 50, 52, the insulative member 54, and the ring member 28 thereon, is loaded into the first pipe end 12 until the spacers 30 are in contact with, or immediately adjacent, the pipe end 12. Then, the second pipe end 14 is manipulated over the sleeve until the pipe end contacts the spacers 30. At this point, the pipe ends 12, 14 are tack welded together at multiple discrete locations between the spacers 30 without incorporating the spacers 30 into the weld. For example, if three pins are used, three tack welds are located to connect the pipe ends 12, 14 midway between the three spacers 30. The spacers 30 are then removed, preferably by hitting the portion thereof extending outwardly beyond the pipe ends 12, 14 with a hammer. Then the weld is completed in multiple passes. During welding, a small gap is maintained to allow air to vent from the area between the sleeve 16 and the pipe ends 12, 14, and the gap is closed at the end of the welding process. If the sleeve 100 is used in conjunction with a cement lined pipe, the ring member 28 and the spacers 30 need not be used if the lining is properly terminated inwardly the pipe end to properly position the sleeve.

Figure 5:
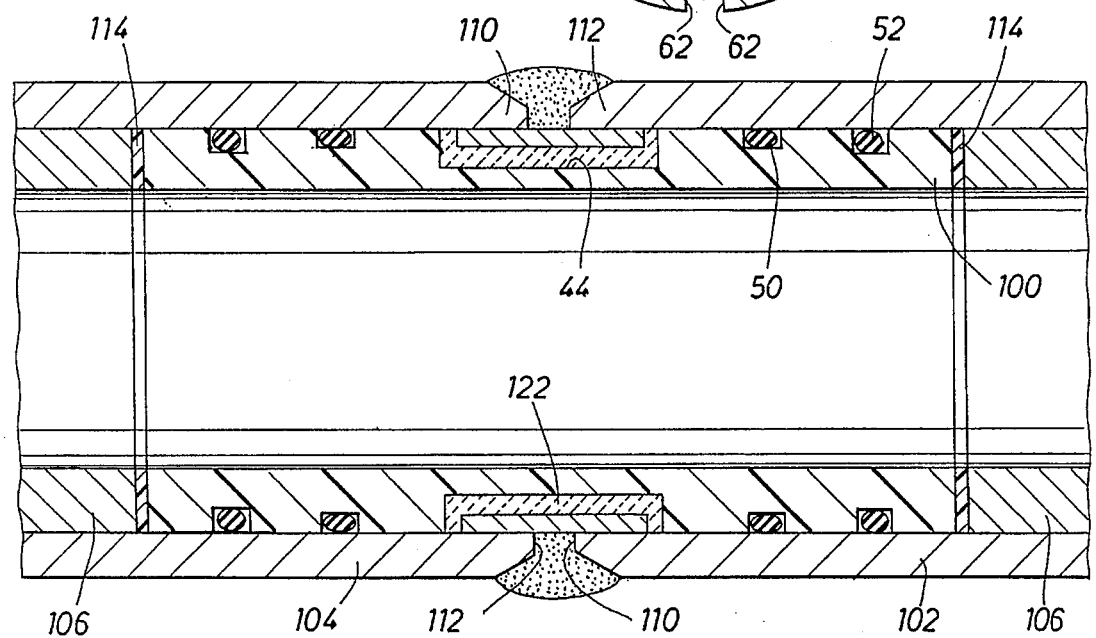
FIG. 5 is a sectional view of a further alternative preferred embodiment of the connection of FIG. 3.

Referring now to FIG. 5, an alternative embodiment of the sleeve 100 is shown. In this embodiment, the sleeve 100 is configured to be received into pipe segments 102,104 having cement linings 106, or another relatively thick lining. The sleeve 100 is identical to the configuration of sleeve 16, except as specifically noted herein. The cement lining 106 is supplied from the pipe supplier, and is set back a specific distance from the ends 110, 112 of the pipe segments 102, 104. The setback distance corresponds to the distance which the sleeve 100 extends inwardly into the pipe ends 110, 112, Such that a space will remain between the ends 110, 112 of the pipe when the sleeve 100 is fully received in the pipe ends 110, 112, which space corresponds with the gap between the pipe ends which is necessary for a proper weld. To ensure that the weld is not exposed to the pipe fluids or gases, seal rings 114 are located between the ends of the sleeve 100 and the ends of the cement lining 106 within the pipe ends 102, 104.

When combined with cement coated pipe, the sleeve 100 of the present invention does not require the spacers 30, because the cement lining 106 within the pipe 102, 104, in cooperation with the sleeve 100, establishes the required gap between the pipe ends 110, 112 for welding. Additionally, the ring member 28 need not be used, because the ends of the cement lining maintain the sleeve 100 in position in the longitudinal direction of the pipe 102, 104. However, the alignment recess 44, and an insulative member 54 therein, are necessary to limit direct heat transfer from the weld into the sleeve 100. Therefore, a ceramic or other insulative member 54 is received in alignment recess 44 to protect the sleeve 100 from direct burning from the weld and to insulate the sleeve 100 from the heat generated from the weld. The member 54 may be configured as a wrap or wraps of silica cloth, which is placed within the recessed area 44, or the material may be adhered to the sides of the recessed area 44, and formed to leave an air gap 122 between the insulative member 54 and the weld. Alternatively, the ring member 28 and the spacers 30 may be used with a cement lined pipe, but so long as the cement lining terminates within the pipe 102, 104 at a proper distance to properly align the sleeve 100 in the pipe 102, 104, the ring member 28 and the spacers 30 are redundant.

Figure 6:
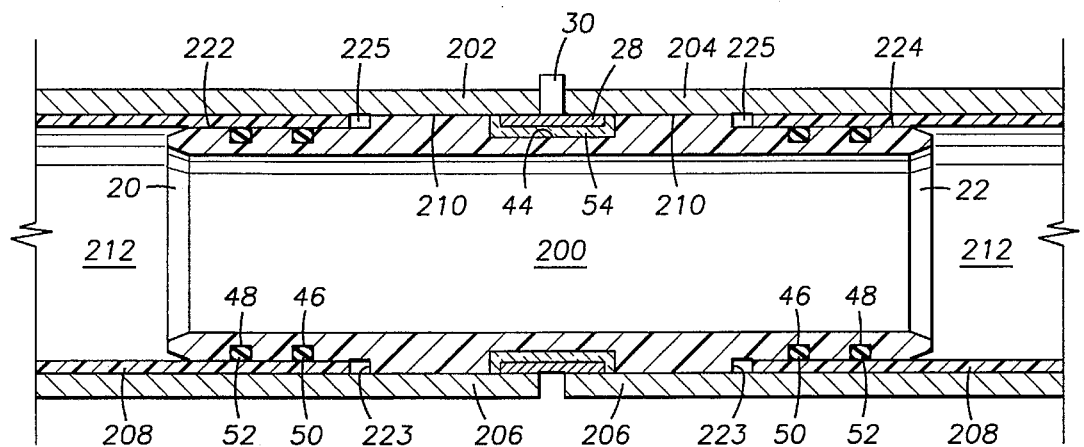
FIG. 6 is a sectional view of an additional preferred embodiment of the present invention in a welded connection.
Figure 7:
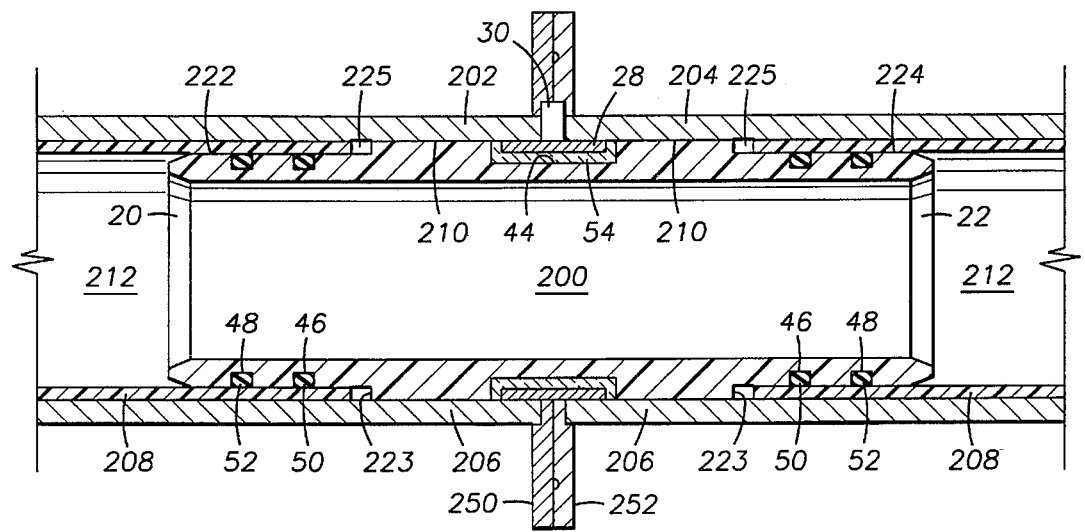
FIG. 7 is a sectional view of the sleeve of the additional preferred embodiment of the present invention in a flange connection of adjacent pipe ends.

Referring now to FIGS. 6 and 7, a further alternative embodiment of the continuous corrosion barrier 10 of the present invention generally includes a sleeve 200 which is received in the adjacent ends 202, 204 of adjacent lengths of an internally sleeved pipe 206. The internally sleeved pipe 206 includes a tubular barrier 208 disposed between the metallic body 210 of the pipe 206 and the internal flowway 212 Of the pipe 206. This tubular barrier 208 provides corrosion protection for the interior wall of the pipe 206 where highly corrosive or erosive materials are present. One typical tubular barrier 208 material is a PTFE type material sold by DuPont Corporation under the trade name Tefzel. This material, or a similar material, is commonly used in chemical plant pipe applications, where highly erosive or corrosive fluids such as gases, liquids, or slurries are flowed through the pipe. The sleeve 200 is in all respects identical to the above described sleeve 16, including, but not limited to, the materials used in the construction of the sleeves 16 and in the spacers 30, except the opposed open ends 20, 22 of the sleeve 200 include recesses 222, 224 which form minor diameter portions at each end of the sleeve 200 which are received within the tubular barrier 208 within the pipe. Where the sleeve 200 is used in conjunction with a welded connection as shown in FIG. 6, the central shielding portion 24 of the sleeve 200 preferably includes the ring member 28 received over a heat shielding member 54 in an alignment recess 44 as in sleeve 16, having a plurality, preferably three to six, of alignment spacers 30 circumferentially spaced thereabout and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided. When the sleeve 200 is properly positioned in the pipe ends 12, 14, the pipe ends 12, 14 contact, or are in close proximity to, the spacers 30. Preferably, the spacers 30 are configured as pins, which extend outwardly from the outer diameter of the pipe, or may be configured as spherical balls. As with the sleeve 16, the spacers are preferably removable, so as to space apart the pipe ends for welding, but not be incorporated in the weld joining the pipe ends. However, it has also been found that the spacers need not be used in all applications, because the tubular barrier 208 material may prevent the sleeve 200 from moving laterally within the pipe, i.e., the sleeve 200 will remain locked in place within the pipe. However, because the tubular barrier 208 expands and contracts within the pipe, the sleeve 200 may move slightly within the pipe 206 unless the weld connection is attached to the ring 28.

The recesses 222, 224 adjacent each of the ends 12, 14 of the sleeve 200 preferably include the pair of seal grooves, 46, 48 as in the sleeve 16, which are disposed in the recesses 222, 224, and are also preferably disposed as pairs of seal grooves 46, 48 such that a seal groove 46 or 48 is located on either side of, and equidistant from, the alignment recess 44. Each of the recesses 222 or 224 terminates inwardly of the sleeve end 22 or 24 in an annular ledge 223, which, in combination with the surface of the recesses 222, 224, define a minor diameter portion on each end of the sleeve 200. The inboard seal groove 46 has a first depth to accommodate a first seal 50 such as an o-ring therein. The first seal 50 is preferably a high temperature seal configured from a high temperature material, such as silicone, capable of withstanding a temperature of approximately 300 degrees fahrenheit. The second groove 48 is positioned between the first groove 46 and the adjacent end 20 or 22 of the pipe, and is sized at a second depth, greater than that of the first groove 46, to receive a second seal 52 such as an o-ring therein. The second seal 52 may be a buna material capable of withstanding temperatures on the order of 150 degrees fahrenheit. The seals 50, 52 preferably have the same cross section, and therefore the first seal 50 will extend further from the recesses 222, 224 of the sleeve 16 than will the second seal 52 prior to insertion of the sleeve 16 into the pipe end 12 or 14. Typically, the first seal 50 should be received in a first seal groove 46 having a groove depth of 0.060 inches, and the second seal 52 should be received in a groove 48 having a depth of 0.080 inches, where the seal has a nominal thickness of 0.125 inches. Also, the highest compression set of the seal is preferably about 25%. If the sleeve 16 will be exposed to high pressures within the pipe, backup rings may be provided in the grooves 46, 48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the material used in the seal 46 or 48.

The recesses 222, 224 are sized such that the outer diameter of the sleeve 200, at the recesses 222, 224, is slightly smaller than the inner diameter of the tubular barrier 208 maintained within the sleeved pipe 206. Thus, the outer diameter of the second seal 52 in the recesses 222, 224 will be at one end of the tubular barrier 208 inner diameter tolerance, and the outer diameter of the second seal 52 will be sized at the other end of the tubular barrier 208 inner diameter tolerance. Typically, the tubular barrier material conforms to the inner diameter of the pipe, so that the tolerance range that the seal 46, 48 must span is based on the tolerance of the pipe 206 plus the tolerance on the wall thickness of the tubular barrier 208. To place the sleeve 200 in the adjacent ends of the pipe 206, the tubular barrier 208 is cut off within the pipe at a distance from the pipe end slightly greater than the length of the recesses 222, 224 on the sleeve 200, and the sleeve 200, with the o-rings 50, 52 thereon, is inserted into the ends of the sleeved pipe 206. Alternatively, the tubular barrier 208 may be supplied terminated inwardly of the pipe end 202, 204. By providing the depth of the cut off of the tubular barrier 208 inwardly of the adjacent end 202 or 204 of the pipe 206 as slightly greater than the length of the recesses 222, 224, a small gap 225 may be provided between the annular ledge 223 of the sleeve 200 and the end of the tubular barrier 208 at ambient temperatures. This gap 225 allows for thermal expansion of the tubular barrier 208 material when hot fluids are passed through the pipe, without the sleeve 200 or tubular barrier 208 becoming excessively compressively loaded.

Once the sleeve 200 is positioned in the pipe ends 202, 204, the pipe ends 202, 204 may be welded together, as described herein for the connection 10 using the sleeve 16, i.e., using the spacers 30, or as described herein using the sleeve 100 where the spacers are not used in conjunction with the sleeve 200, to complete the connection. Additionally, as shown in FIG. 7, the connection of the pipe ends 202, 204 may be provided by welding flanges 250, 252 to the pipe ends 202, 204 before the connection is made, and then joining the pipe end at the flange with mechanical means such studs and nuts, clamps, and the like. In this configuration, the spacers 30 may be used to center the sleeve 200 within the pipe ends, or, the spacers may be removed, so long as the pipe includes a barrier material such as tubular barrier 208, or another internal member, that is capable of preventing substantial lateral movement of the sleeve 200 from the connection of the pipe ends at the flanges.

The structure of the sleeve 200 provides substantial benefit to pipe line applications, such as pipe runs in chemical plants or refineries, because it eliminates the need for the flanged connection of the pipe 206 and the inner barrier material 208. By eliminating the flanged connection, and instead welding the pipe ends 202 together, the costs of flanging the pipe 206 and flaring the ends of the barrier 208 are eliminated. Likewise, the elimination of the flanged connection, fugitive emissions from the pipe connection are eliminated. Further, by eliminating the flange connection, and instead cutting the barrier 208 off inwardly of the pipe ends 202, 204, the loading of the tubular barrier 208 from thermal cycling is substantially eliminated. This permits the use of longer pipe lengths, because the barrier 208 may expand linearly within the pipe 206 up to the size of the gap 225 between the annular wall 223 on the sleeve 200 and the end of the barrier 208 without risk of failing the barrier 208. Additionally, the use of the sleeve 200 eliminates the failure point in the tubular barrier 208 existing at the flared corner needed in the prior art, thus increasing the reliability of the connection. Finally, the sleeve 200 may be used in conjunction with a flanged connection, and still provide the improvements in the reduction of thermally induced stresses in the barrier 208. Where the sleeve 200, or the sleeves 16, 100, are used in conjunction with flanged pipe, the spacers 30 need not be provided, but over means, such as the inner barrier 200, must be present to prevent the sleeve 200 from moving within the pipe by a distance sufficient to expose the weld area. Additionally, where the connection is flanged, rather than welded, the heat stability of the sleeve 200 and seal 46, 48 materials is not as critical as in a welded connection, because the connection will not be exposed during use to temperatures approaching those encountered when the pipe ends are welded. Therefore, it is possible, in these circumstances, to provide the sleeve 200 without the heat resistant material 54 and build the sleeve 200 from materials having lower thermal resistance, which further simplifies the manufacture and assembly of the sleeve 200. These modifications to sleeve 200 may also be used, in conjunction with sleeve 100, and sleeve 16, where the connection is not welded. It is even contemplated that the spacers 30 of the sleeve 16 may be placed between the flanges, to secure the sleeve in the pipe ends 20, 22.

The sleeves 16, 100 and 200 provided herein provide a continuous corrosion barrier at the weld joint joining adjacent pipe ends 12, 14, pipe ends 110, 112 or pipe ends 202, 204. In one embodiment of the invention, the sleeves 16, 100 and 200 are integrally non-corrosive, and therefore need not be separately coated with a protective barrier to prevent corrosion or erosion thereof. Additionally, the sleeves 16, 100 and 200 may be used without the risk of affecting the weld by the sacrificing of alignment boss, i.e., the spacer 30, material into the weld. Further, the portion of the protective coating on the inside of the pipe ends 12, 14, or the barrier 208, which would be burned or otherwise modified by the heat of welding to the point where it loses its protectiveness is limited to the areas protected by the seals 50, 52, and the inner diameter of the sleeve 16, 100, 200 is not adversely affected by the weld heat where the sleeve 16, 100 or 200 is a solid insulative member. Further, because the edges of the ring member 28 are isolated from the sleeve 16 by the insulative member 54, the quantity of the weld heat which actually transfers to the inner diameter of the sleeve is reduced. Therefore, if the sleeve 16, 100 or 200 is a coated metallic member, the inner coating of the sleeve 16, 100 or 200 is far less likely to be affected by the weld heat. Where the sleeves 16, 100 or 200 are configured as solid insulative members, such as from PTFE, they may be used without deleterious effect even if they are cut or nicked, because no base metallic material can be exposed as would occur with the prior art coated metallic sleeves. Further, where the sleeve 16, 100 or 200 is non-metallic, a magnetic inspection pig may more easily inspect the pipe and weld area, because no secondary metallic barrier extends over the weld. Finally, the multiple seal arrangement ensures that the sleeves 16, 100 or 200 will protect the weld area irrespective of the size of the pipe within each pipe size tolerance.

Preferably, the sleeve 16, 100 or 200 has greater elasticity than the outer pipe material, so that the sleeve 16, 100, or 200 will expand to further seal against the inner wall of the pipe when materials are flowed, under pressure, through the pipe. Preferably, the sleeve 16, 100 or 200 is configured as a unitary piece of a material such as PTFE, although an elastic core member, having a PTFE or similar layer thereover, is specifically contemplated. Where the sleeve 16, 100 or 200 is made of PTFE, and the pipe is configured from steel, it has been found that the sleeve will physically deform outwardly against the pipe inner diameter when pressurized materials are flowed through the pipe. For example, where the thickness of the sleeve 200 is approximately 0.300 inches thick, and at the recesses 222, 224 is approximately 0.210 inches thick, the pressure within the pipe may be sufficient to radially expand the sleeve 200 outwardly to seal against the inner diameter of the pipe 206 and the barrier 208. At the end of the sleeve 200, this sealing provides a third seal area, in addition to the seal rings 46, 48, to ensure that a continuous corrosion barrier is formed at the connection of the two adjacent pipes 206. However, the seals 52, 54 should still be used to seal the connection, to provide sealing during the period of time when the connection is at low pressures, such as the initial use of the pipe or when low pressure fluids are flowed therethrough. Additionally, by providing a wall thickness on any of the sleeves 16, 100, 200 described herein, the sleeve itself may be used to provide additional sealing area at the weld or other connection of the pipe ends.

Although the preferred embodiments of the invention have been described embodying multiple features of the invention, each of the individual features of the invention may be used separately, or concurrently, to provide improvements in the connection of pipe ends 12, 14. For example, the ring member 28 may be configured of non-metallic members, or the spacers 30 may extend through the ring member 28, and be semi-permanently affixed to the sleeve. The ring may also be formed from a material having low thermal conductivity which, when coupled against a ferrous material such as the pipe, does not create a galvanic reaction but is attachable to the weld. In such circumstance, the ring member 28 may be embedded in the sleeve 16, or integrally formed therein.

We claim:

1. A continuous corrosion barrier for interconnections of adjacent ends of lengths of pipe, wherein the pipe includes an internal tubular barrier extending longitudinally therein to block access of the materials flowing through the pipe with the pipe material, comprising:

a sleeve having a cylindrical outer surface, a cylindrical inner surface, and opposed first and second ends, said cylindrical outer surface having at least a first minor diameter portion extending inwardly of said outer cylindrical surface and extending along said outer cylindrical surface inwardly of said end;

a first seal extending circumferentially about said first minor diameter portion;

a second seal extending circumferentially about said first minor diameter portion intermediate of said first seal and said first end;

said first seal extending a first height from said first minor diameter portion and said second seal extending a second height from said first minor diameter portion, said first height exceeding said second height; and said minor diameter portion received within the inner diameter of the internal barrier in the pipe and at least one of said first seal and said second seal engaging the inner diameter of the internal barrier.

2. The continuous corrosion barrier of claim 1, further including an alignment recess extending inwardly of said outer cylindrical surface intermediate of said sleeve first and second ends.

3. The continuous corrosion barrier of claim 2, wherein said alignment recess includes a plurality of removable spacers extending therefrom.

4. The continuous corrosion barrier of claim 3, wherein said spacers are received on a ring, and said ring is received in said alignment recess.

5. The continuous corrosion barrier of claim 4, wherein the adjacent pipe ends are joined at a weld, and said weld adheres to said ring member.

6. The continuous corrosion barrier of claim 1, wherein said first seal is configured from a high temperature conformable material.

7. The continuous corrosion barrier of claim 6, wherein said second seal is configured from a material having a lower temperature resistance than the material of said first seal.

8. The continuous corrosion barrier of claim 1, wherein said sleeve is configured from a non-metallic material.

9. The continuous corrosion barrier of claim 1, wherein the pipe ends are connected by flanges.

10. The continuous corrosion barrier of claim 1, wherein said sleeve has greater elasticity than the pipe material.

11. A method of forming a continuous corrosion barrier at the juncture of two pipes, wherein the pipes include an internal barrier extending approximately the length of the pipes, comprising the steps of:

providing the terminus of the internal barrier near the end of the pipe;

providing a tubular sleeve, having opposed ends, an inner circumferential surface, an outer circumferential surface, and at least a first circumferential recess extending radially inward of the outer circumferential surface of the sleeve and extending axially along the outer cylindrical surface inward from one of the sleeve ends;

inserting the sleeve inwardly of a pipe end so that the internal barrier is received in the circumferential recess.

12. The method of claim 11, further including the steps of:

providing a first seal ring extending about the circumference of the circumferential recess by a first height; and providing a second seal ring extending about the circumference of the circumferential recess by a second height.

13. The method of claim 12, wherein the first seal ring extends further from the surface of the cylindrical recess than the second seal ring extends from the cylindrical recess.

14. The method of claim 13, wherein the second seal ring is disposed intermediate of the first seal ring and the adjacent sleeve end.

15. The method of claim 11, further including the steps of:

providing an alignment recess in the outer circumferential surface of the sleeve;

providing a support ring in the recess; and extending at least one spacer from the support ring.

16. The method of claim 15, further including the steps of:

first placing one end of the sleeve inwardly of a pipe and placing the spacer in contact with the end of the pipe;

placing a second length of pipe over the portion of the sleeve extending from the pipe, and abutting the second pipe end against the spacer;

welding portions of the pipe ends together without incorporating the spacer in the weld;

removing the spacer; and welding the pipe ends together.

17. An apparatus for providing a continuous corrosive barrier at a welded connection of pipe having an internal corrosion resistant barrier therein, comprising:

a heat and corrosion resistant monolithic sleeve member comprising inner and outer cylindrical surfaces, opposed ends received within the pipe adjacent the weld connection, a first circumferential recess disposed intermediate the opposed ends and aligned with the weld connection, and at least a second circumferential recess extending radially inward of the outer circumferential surface of the sleeve and extending axially along the outer cylindrical surface inward from one of the sleeve ends;

a circumferential metal ring member disposed within the first recess, the ring having an outer diameter slightly less than the inner diameter of the pipe and an inner diameter sufficiently less than the outer diameter of the first recess so that the sleeve is secured relative to the ring; and an insulative member disposed between the ring and the sleeve.

18. The apparatus of claim 17 wherein the ring member is included in the welded connection.

* * * * *